(12) United States Patent  
Kao

(10) Patent No.: US 10,045,423 B2  
(45) Date of Patent: Aug. 7, 2018

(54) ILLUMINATING CONTROL SYSTEM AND METHOD FOR CONTROLLING ILLUMINATING DEVICE

(71) Applicant: VIVOTEK INC., New Taipei (TW)

(72) Inventor: Peng-Feng Kao, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/462,905

(22) Filed: Mar. 19, 2017

(65) Prior Publication Data

US 2017/0290130 A1  Oct. 5, 2017

(30) Foreign Application Priority Data

Mar. 31, 2016  (TW) .............................. 105110337 A

(51) Int. Cl.  
*H05B 37/02* (2006.01)

(52) U.S. Cl.  
CPC ................................ *H05B 37/0227* (2013.01)

(58) Field of Classification Search  
CPC .............. H05B 37/0227; H05B 37/029; H05B 37/0609  
USPC ................................... 315/12, 219, 152, 153  
See application file for complete search history.

(56) References Cited

U.S. PATENT DOCUMENTS

| 9,629,220 B2 * | 4/2017 | Panopoulos ....... H05B 37/0209 |
| 2012/0068608 A1 * | 3/2012 | Covaro ..................... G01J 1/18 |
| | | 315/151 |
| 2012/0206050 A1 * | 8/2012 | Spero ....................... B60Q 1/04 |
| | | 315/152 |
| 2012/0310703 A1 * | 12/2012 | Cavalcanti ......... G06Q 30/0201 |
| | | 705/7.29 |
| 2013/0128042 A1 * | 5/2013 | Bridge ..................... H04N 7/18 |
| | | 348/143 |
| 2014/0086590 A1 * | 3/2014 | Ganick .................. G06Q 30/02 |
| | | 398/118 |
| 2015/0035437 A1 * | 2/2015 | Panopoulos ............ F21V 14/02 |
| | | 315/112 |
| 2015/0091446 A1 * | 4/2015 | Ohta .................... H05B 37/029 |
| | | 315/153 |
| 2016/0195856 A1 * | 7/2016 | Spero ..................... G06N 5/046 |
| | | 700/90 |

(Continued)

FOREIGN PATENT DOCUMENTS

TW        201419944 A    5/2014  
TW        201601599 A    1/2016

(Continued)

*Primary Examiner* — Douglas W Owens  
*Assistant Examiner* — Syed M Kaiser  
(74) *Attorney, Agent, or Firm* — CKC & Partners Co., Ltd.

(57) ABSTRACT

An illuminating control system for controlling a plurality of illuminating devices is disclosed herein. The illuminating control system includes an image capturing device and a processor. The image capturing device is configured to capture images of an object. The processor is coupled to the image capturing device. The processor is configured to receive the images and determine whether the object is a predetermined object based on the images. If the processor determines that the object is the predetermined object, the processor controls the image capturing device to track the object to obtain a moving condition of the object. The processor turns on one of the illuminating devices correspondingly based on the moving condition of the object.

18 Claims, 6 Drawing Sheets

(56) References Cited

U.S. PATENT DOCUMENTS

2017/0166067 A1* 6/2017 Panopoulos .......... B60L 11/182

FOREIGN PATENT DOCUMENTS

| TW | M519371 U | 3/2016 |
|---|---|---|
| WO | 2015196895 A1 | 12/2015 |

* cited by examiner

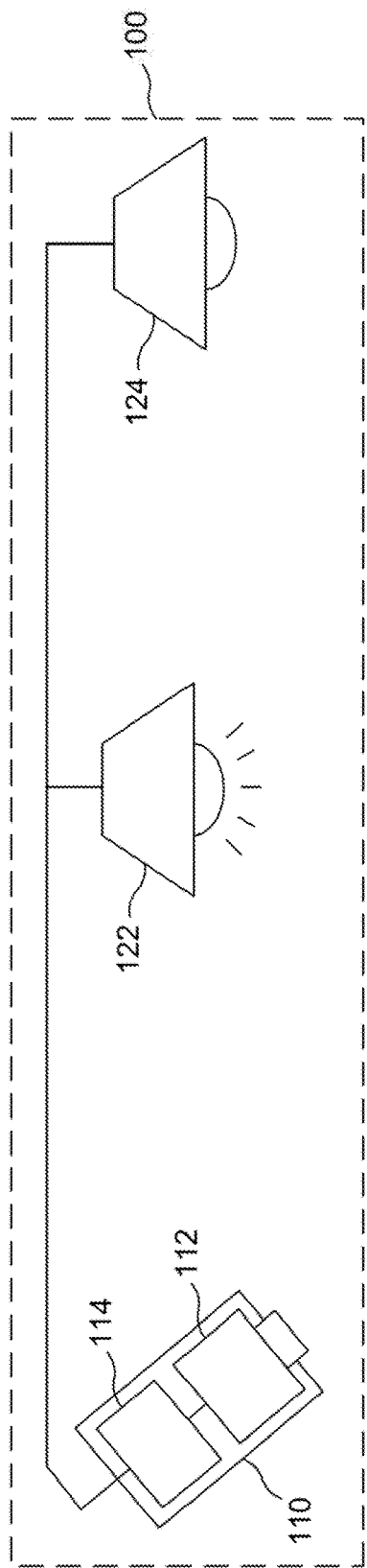
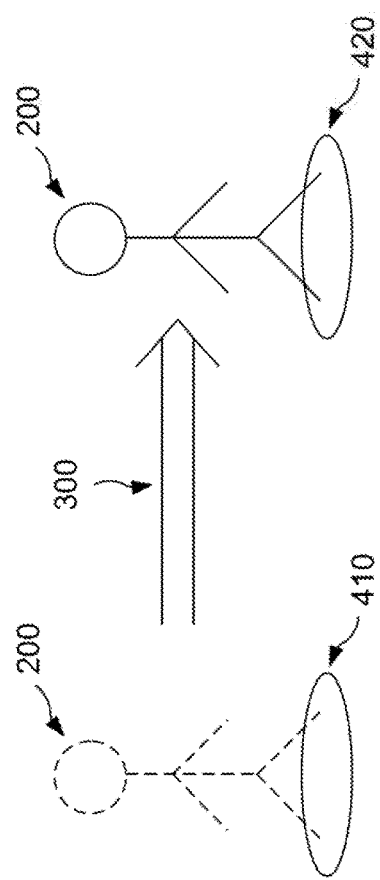
Fig. 2

ILLUMINATING CONTROL SYSTEM AND METHOD FOR CONTROLLING ILLUMINATING DEVICE

RELATED APPLICATIONS

This application claims priority to Taiwan Application Serial Number 105110337, filed Mar. 31, 2016, which is herein incorporated by reference.

BACKGROUND

Field of Disclosure

The present disclosure relates to a control system and a control method. More particularly, the present disclosure relates to an illuminating control system and a method for controlling an illuminating device.

Description of Related Art

The prior art lighting fixtures typically detect moving objects by utilizing passive infrared sensors (PIRs) to control the turning on or turning off of the lighting fixtures so as to achieve the effects of both energy saving and real-time illumination. The principle of the above control method lies in that an object capable of generating heat energy will more or less emit light invisible to the human eye, that is, infrared light. For example, warm water, candlelight, a light bulb, a human body, an object irradiated by sunlight, etc. all emit infrared light. Therefore, whether an object is present or not can be sensed by detecting the infrared light emitted from or reflected by the moving object so as to control the turning on or turning off of the lighting fixture correspondingly.

However, the prior art passive infrared sensor can only detect moving objects but can not determine the types of the moving objects. Frequent problems thus occur, for example, a bird flies through the detection range of the passive infrared sensor and the passive infrared sensor will act to control the lighting fixture to turn on, but in fact the flying bird is not the moving object of concern by the user. This action actually causes the user's problem. In addition, using a passive infrared sensor to detect moving objects so as to control the lighting fixtures can not determine the moving direction of the objects and turn on the lighting fixtures in advance, its usage is therefore subject to certain restrictions.

For the forgoing reasons, there is a need to solve the above-mentioned problems by providing an illuminating control system and a method for controlling an illuminating device.

SUMMARY

The foregoing presents a simplified summary of the disclosure in order to provide a basic understanding to the reader. This summary is not an extensive overview of the disclosure and it does not identify key/critical devices of the present disclosure or delineate the scope of the present disclosure. Its sole purpose is to present some concepts disclosed herein in a simplified form as a prelude to the more detailed description that is presented later.

An illuminating control system for controlling a plurality of illuminating devices is provided. The illuminating control system comprises an image capturing device and a processor. The image capturing device is configured to capture images of an object. The processor is coupled to the image capturing device. The processor is configured to receive the images and determine whether the object is a predetermined object based on the images. If the processor determines that the object is the predetermined object, the processor controls the image capturing device to track the object so as to obtain a moving condition of the object. The processor turns on one of the illuminating devices correspondingly based on the moving condition of the object.

The disclosure provides a method for controlling an illuminating device. The method for controlling the illuminating device comprises the following steps: receiving an image of an object; determining whether the object is a predetermined object based on the image; tracking the object to obtain a moving condition of the object if the object is determined to be the predetermined object; and turning on one of a plurality of illuminating devices correspondingly based on the moving condition of the object.

Therefore, according to the technical content of the present disclosure, the embodiments of the present disclosure provide an illuminating control system and a method for controlling an illuminating device to improve the problem that the prior art passive infrared sensor can only detect moving objects but can not determine the types of the moving objects, and also improve the problem that the prior art passive infrared sensor can not determine the moving direction of the objects and can not turn on the lighting fixtures in advance.

Many of the attendant features will be more readily appreciated as the same becomes better understood by reference to the following detailed description considered in connection with the accompanying drawings.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 depicts a schematic diagram of an illuminating control system and an operation method thereof according to some embodiments of this disclosure;

According to the usual mode of operation, various features and devices in the figures have not been drawn to scale, which are drawn to the best way to present specific features and devices related to the disclosure. In addition, among the different figures, the same or similar element symbols refer to similar devices/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" or "connect" refers to direct physical contact or electrical contact or indirect physical contact or electrical contact between two or more devices. Or it can also refer to reciprocal operations or actions between two or more devices.

Figure 1:
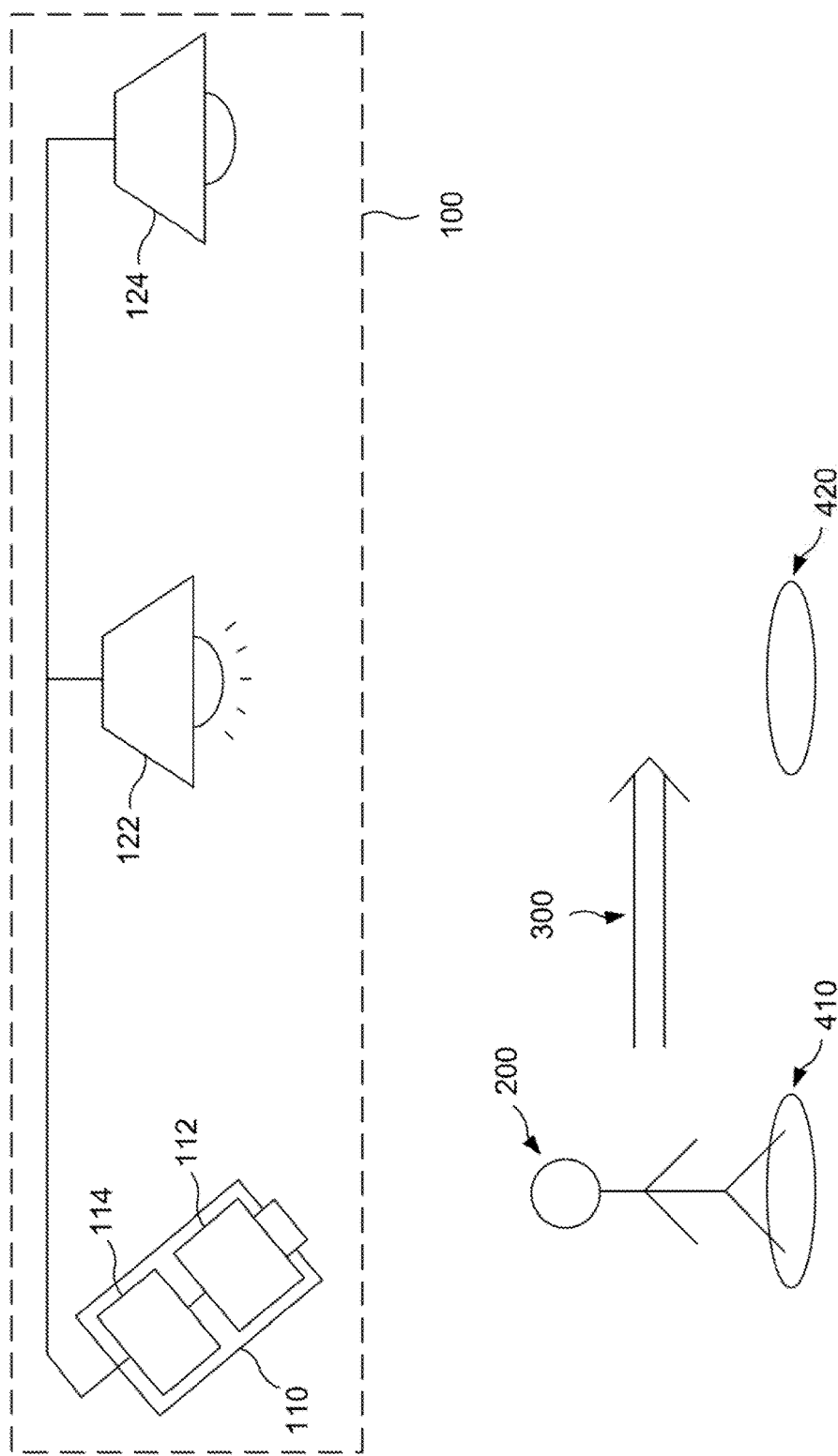
FIG. 1 depicts a schematic diagram of an illuminating control system and an operation method thereof according to some embodiments of this disclosure.

FIG. 1 depicts a schematic diagram of an illuminating control system 100 and an operation method thereof according to some embodiments of this disclosure. As shown in the figure, the illuminating control system 100 comprises an image capturing device 112, a processor 114, and a plurality of illuminating devices (such as illuminating devices 122, 124). As for coupling relationships, the processor 114 is coupled to the image capturing device 112. The plurality of illuminating devices (such as the illuminating devices 122, 124) are coupled to the processor 114.

As for operations, the image capturing device 112 is configured to capture images of an object 200. The processor 114 is configured to receive the images of the object 200 and determine whether the object 200 is a predetermined object based on the images of the object 200. If the processor 114 determines that the object 200 is the predetermined object, the processor 114 controls the image capturing device 112 to keep tracking the object 200 so as to obtain a moving condition 300 of the object 200. The processor 114 further turns on one of the illuminating devices (such as the illuminating devices 122, 124) correspondingly based on the moving condition 300 of the object 200.

For example, the predetermined object may be a human being. Subsequently, the image capturing device 112 captures the images of the object 200, and then the images of the object 200 are received and whether the object 200 is the human being is determined based on the images of the object 200 by the processor 114. If the processor 114 determines that the object 200 is the human being (in order to facilitate explanation and understanding, the human being will be represented by a user in the following), the processor 114 controls the image capturing device 112 to keep tracking the user 200 so as to obtain the moving condition 300 of the user 200. After that, the processor 114 correspondingly turns on the illuminating device 122 based on the moving condition 300 of the user 200, such as the user 200 moving in a direction towards the illuminating device 122.

In this manner, the illuminating control system 100 according to the present disclosure can determine the type of the object 200, and only responds to the predetermined object so as to correspondingly turn on the illuminating device (122, 124) based on the moving condition 300 of the predetermined object. If the predetermined object is set as the user 200, the illuminating control system 100 according to the present disclosure only responds to the user 200 so as to correspondingly turn on the illuminating device (122, 124) based on the moving condition 300 of the user 200. For cats, dogs, or birds, etc. that are not the predetermined objects, the illuminating control system 100 according to the present disclosure will not respond to achieve the objective of power saving. Illuminating schemes satisfying the needs of actual use can also be effectively provided. In addition, since the illuminating control system 100 according to the present disclosure can correspondingly turn on the illuminating device (122, 124) based on the moving condition of the user, an illuminating device corresponding to a next position (such as an illuminating device closest to the next position or an illuminating device having an illuminating range to be the next position) will be turned on, thus facilitating the user to clearly see the environmental condition in a moving direction when the user moves.

In one embodiment, the processor 114 predicts a first moving position 420 of the object 200 based on the moving condition 300 to turn on a first illuminating device 122 of the plurality of illuminating devices (122, 124) corresponding to the first moving position 420. For example, the processor 114 will predict the first moving position 420 of the user 200 (the next position that is possibly reached by movement) based on the moving condition 300 of the user 200 to turn on the first illuminating device 122 of the illuminating devices (122, 124) corresponding to the first moving position 420. In one embodiment, the processor 114 will turn on the first illuminating device 122 of the plurality of illuminating devices (122, 124) closest to the first moving position 420 correspondingly based on the first moving position 420 of the user 200 thus predicted. In one embodiment, the processor 114 will turn on the illuminating device 122 (that is, the first illuminating device 122) of the illuminating devices (122, 124) that has an illuminating range covering the first moving position 420 based on the first moving position 420 of the user 200 thus predicted. The present embodiment is applicable to the condition in which another illuminating device is closer to the first moving position 420 but an illuminating range of that illuminating device does not comprise the first movement position 420 (for example, the illuminating angle is towards another direction). Under the circumstances, the illuminating device that has the illuminating range covering the first moving position 420 can be turned on instead of the illuminating device closet to the first moving position 420. In another embodiment, the processor 114 turns on the first illuminating device 122 corresponding to the first moving position 420. The illuminating range of the first illuminating device 122 corresponds to an illuminating range corresponding to the first moving position 420 that is set by the user 200 in advance. For example, when the moving position 420 is a hallway of a home entrance, the processor 114 will turn on an illuminating device that illuminates the painting on a wall of the hallway instead of an illuminating device that directly illuminates the first moving position 420. When considering the above embodiments in which "the processor 114 predicts the first moving position 420 of the user 200 based on the moving condition 300 of the user 200 to turn on the first illuminating device 122 of the illuminating devices (122, 124) corresponding to the first moving position 420", the user 200 may perform a setting process depending on personal needs, and is not limited to the above embodiments. Take another embodiment in which the usage scenario is a parking lot, the user 200 is a vehicle, and each parking space has an illuminating device above it for example, the processor 114 will predict the first moving position 420 (the next position that is possibly reached by movement) of the vehicle based on the moving condition 300 when the vehicle enters the parking lot. Under the circumstances, an illuminating device above a parking space that is closet to the first moving position 420 thus predicted and is empty (available for parking) will be turned on to guide the vehicle to quickly find the empty parking space.

In another embodiment, the processor 114 controls the first illuminating device 122 to illuminate a first brightness when the first moving position 420 of the object 200 is predicted. For example, when the processor 114 predicts the first moving position 420 of the user 200 (a next position that is possibly reached), the processor 114 controls the first illuminating device 122 to illuminate a 30% brightness in advance before the user 200 moves to the first moving position 420 to allow the user 200 to see the environmental condition in a moving direction when the user 200 moves. It is noted that the present disclosure is not limited to the system structure of the illuminating control system 100 shown in FIG. 1, it is merely an illustrative example of one of the implementation methods of the present disclosure. For example, the image capturing device 112 and the processor 114 may be disposed in a single camera 110 in the figure. However, depending on practical needs, the processor 114 may also be disposed outside the camera 110. The processor 114 serves as a central processing device to collectively collect images captured by the image capturing devices 112 of a plurality of cameras 110 so as to collectively perform judgmental operations and subsequent control processes.

FIG. 2 depicts a schematic diagram of an illuminating control system and an operation method thereof according to some embodiments of this disclosure. When the object 200 actually reaches the first moving position 420, the processor 114 will further control the first illuminating device 122 to illuminate a second brightness. The second brightness is greater than the first brightness. For example, when the user 200 actually reaches the first moving position 420, the processor 114 controls the first illuminating device 122 to illuminate a 100% brightness. As compared with the situation in which the first moving position 420 of the user 200 is predicted to control the first illuminating device 122 to illuminate the 30% brightness in advance, the situation here is that the first illuminating device 122 is not controlled to illuminate the 100% brightness until the user 200 actually reaches the first moving position 420. The principle of the above stepwise control of the illuminating brightness of the illuminating device is as follows. If only the first moving position 420 of the user 200 is predicted, only control the first illuminating device 122 to turn on a partial brightness to provide the user 200 with a basic illuminating condition so as to see the environmental condition in a moving direction when the user 200 moves because it is not completely sure whether the user 200 will actually walks towards the first moving position 420. Only when the user 200 actually walks to the first moving position 420 is the first illuminating device 122 controlled to turn on a complete brightness, thus facilitating the user 200 to clearly see the environmental condition in the surroundings of the first moving position 420.

Figure 3:
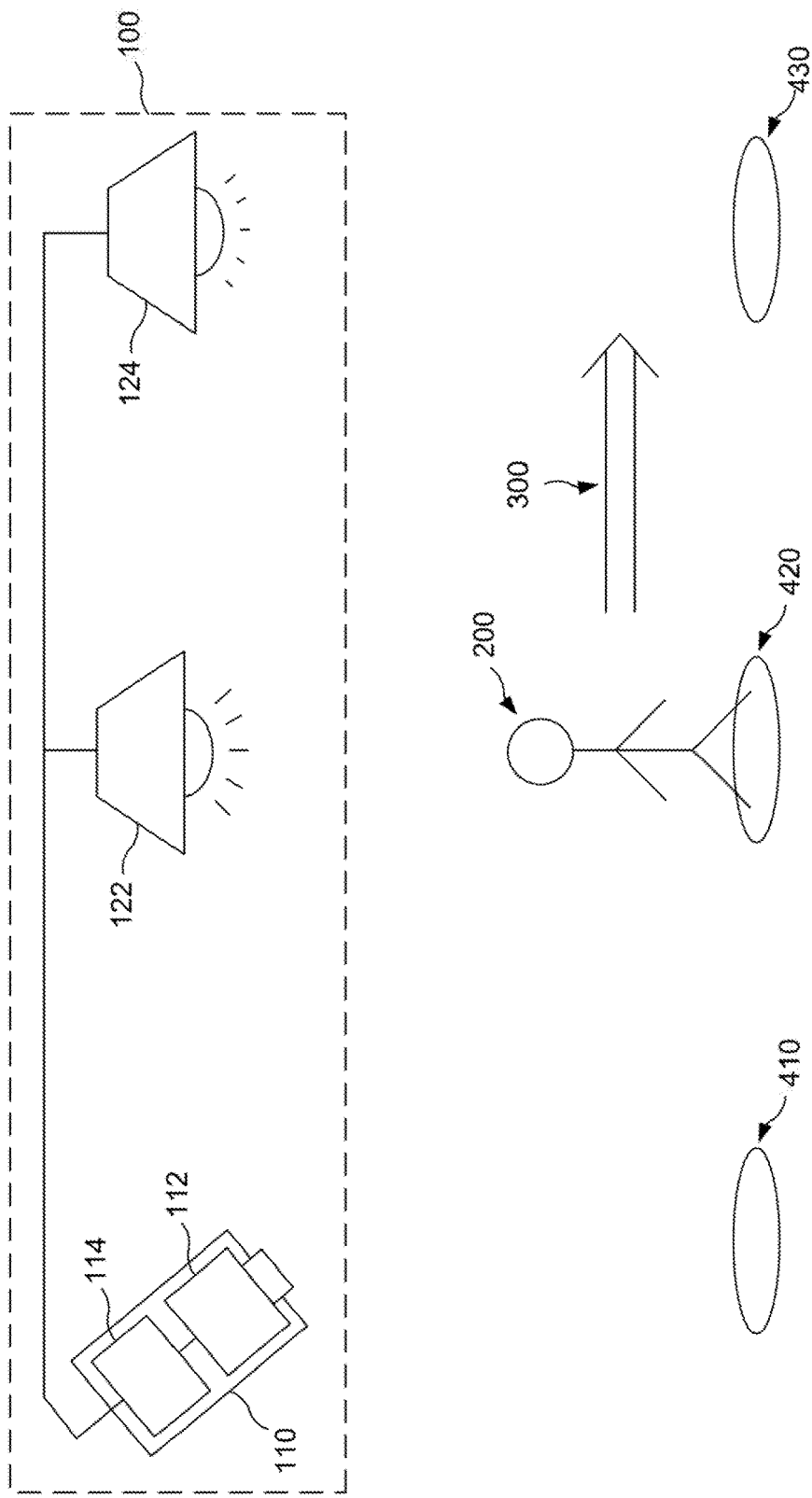
FIG. 3 depicts a schematic diagram of an illuminating control system and an operation method thereof according to some embodiments of this disclosure.
Figure 4:
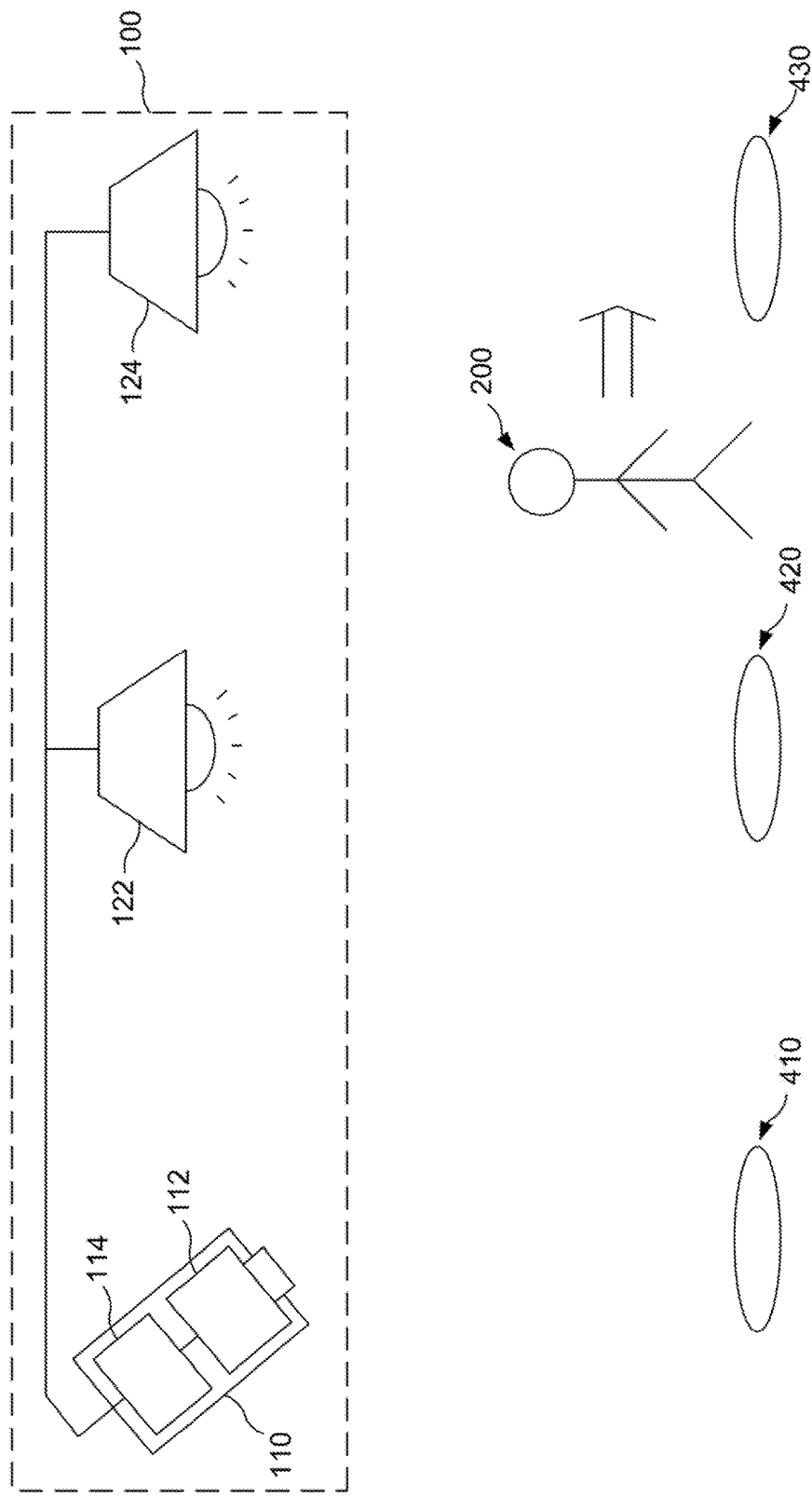
FIG. 4 depicts a schematic diagram of an illuminating control system and an operation method thereof according to some embodiments of this disclosure.
Figure 5:
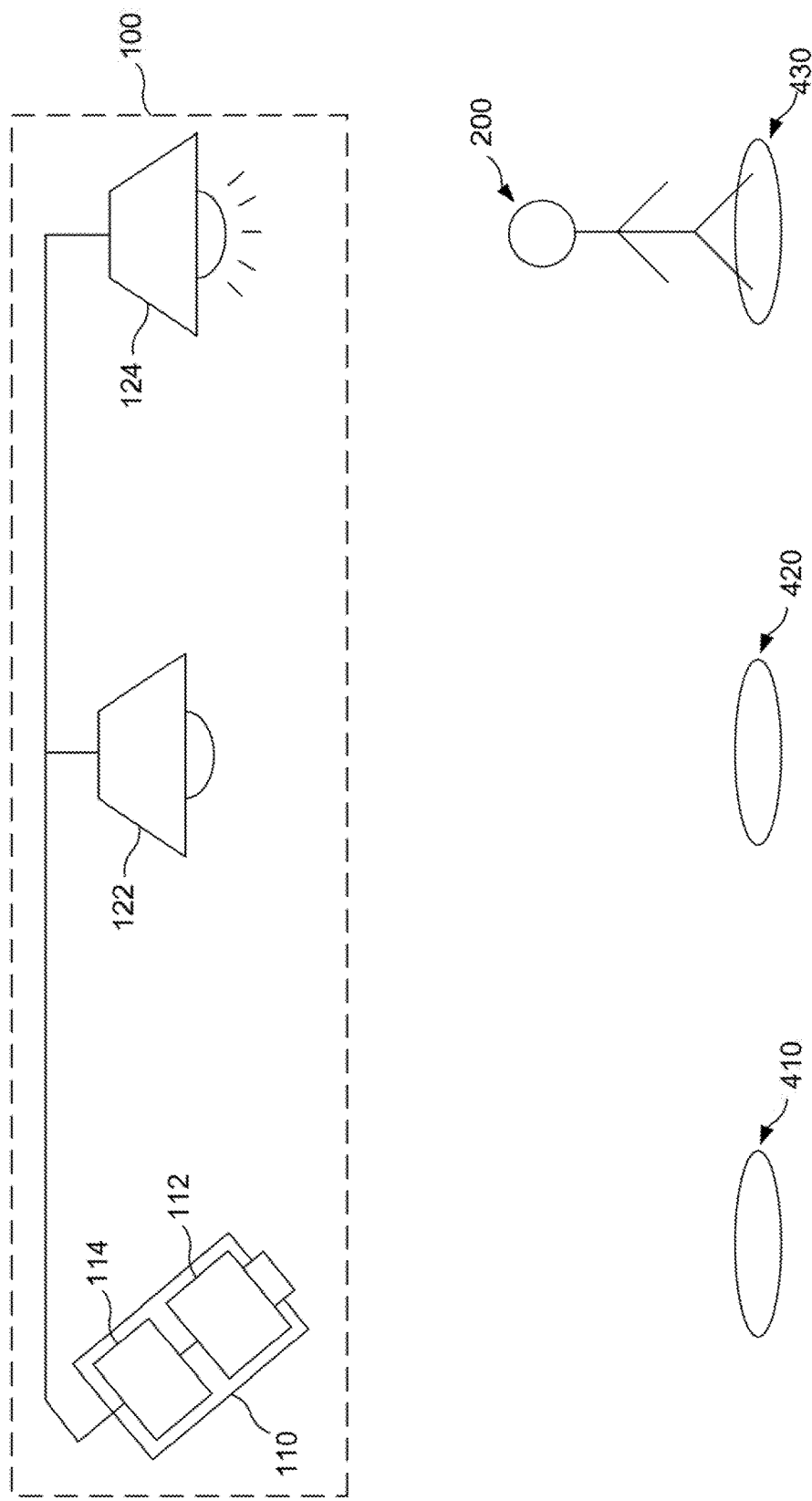
FIG. 5 depicts a schematic diagram of an illuminating control system and an operation method thereof according to some embodiments of this disclosure.

FIG. 3 depicts a schematic diagram of an illuminating control system and an operation method thereof according to some embodiments of this disclosure. In still another embodiment, the processor 114 further predicts a second moving position 430 of the object 200 based on the moving condition 300. For example, the processor 114 will keep tracking the moving condition 300 of the user 200 to predict the second moving position 430 (the user 200 is currently at the first moving position 420, and the second moving position 430 that is possibly reached next is further predicted based on the continuous moving condition 300) of the user 200 based on the moving condition 300. A description is provided with reference to FIG. 4. FIG. 4 depicts a schematic diagram of an illuminating control system and an operation method thereof according to some embodiments of this disclosure. When the object 200 leaves the first moving position 420, the processor 114 controls the first illuminating device 122 to illuminate a third brightness. For example, when the user 200 leaves the first moving position 420, the processor 114 controls the first illuminating device 122 to illuminate a 20% or 30% brightness. A description is provided with reference to FIG. 5. FIG. 5 depicts a schematic diagram of an illuminating control system and an operation method thereof according to some embodiments of this disclosure. When the object 200 actually reaches the second moving position 430 (has actually left the first moving position 420), the processor 114 will control the first illuminating device 122 to illuminate a fourth brightness or completely turn off the first illuminating device 122. The fourth brightness is smaller than the third brightness. For example, when the user 200 reaches the second moving position 430, the processor 114 controls the first illuminating device 122 to illuminate a 5% or 10% brightness (that is, the 20% or 30% brightness illuminated by the first illuminating device 122 is reduced to the 5% or 10% brightness), or directly turns off the first illuminating device 122.

In the embodiments shown in FIG. 3 to FIG. 5, the principle of stepwise control of the illuminating brightness of the illuminating device is as follows. If the user 200 leaves an original position (such as the first moving position 420), a brightness illuminated by an illuminating device corresponding to the original position (such as the first illuminating device 122) is dimmed to save power, but still allows the user 200 to better understand the environmental condition owing to some brightness when the user 200 walks back. In addition, when the user 200 reaches a next position (such as the second moving position 430), the illuminating device (such as the first illumination device 122) corresponding to the original position (the first moving position 420) is dimmed or directly turned off to further save power.

It is noted that the moving position described in the embodiments of the present disclosure is not limited to a single position point. The moving position may cover an area range, for example, the moving position may be predetermined by the user as an area range of 3*3 m$^2$. When the user moves to the predetermined area range of 3*3 m$^2$, it means that the user moves to the moving position.

In yet another embodiment, the moving condition 300 comprises one of a motion vector and a motion locus. For example, the image capturing device 112 can track the object 200 to obtain a motion vector and a motion locus of the object 200 to allow the processor 114 to perform a judging process so as to predict a next possible moving position. Additionally, the processor 114 performs feature recognition or face detection of the images of the object 200 to determine whether the object 200 is the predetermined object. For example, if the predetermined object is a human being, the processor 114 performs feature recognition or face detection of the images of the object 200 to determine whether the object 200 is the human being. In the above embodiment, the face recognition technology may also be used to determine the object 200 is which user (such as a user A, a user B, a user C, etc.). Since the face recognition technology is well known to those of ordinary skill in the art, a description in this regard is not provided. By way of the above action to determine whether the object 200 is the predetermined object, the shortcoming of the prior art illuminating fixture technology in which an action is caused once a moving object passes can be resolved to effectively screen out the object predetermined by the user that does not satisfy the operation condition, thus allowing the user to better meet his usage demand.

In still another embodiment, a number of predetermined objects may be plural (such as the user A, the user B, the user C, etc.). The above first brightness, second brightness, third brightness, and fourth brightness may respectively correspond to one of the predetermined objects (such as the user A). For example, a brightness table may be established in advance according to requirements or preferences of each user. When the processor 114 determines that the object 200 is the user A, a brightness value corresponding to the user A is found from the brightness table to control the illuminating device based on the corresponding brightness value. As a result, each person has his own brightness value correspondingly so as to satisfy the different illuminating demands of each user. In another embodiment, not only can the illuminating control system according to the present disclosure set a corresponding illuminating brightness according to the requirements or preferences of each user in advance as described above, but the illuminating control system according to the present disclosure can also set illuminating devices corresponding to different illuminating colors. For example, when the object 200 is determined to be the user A, a white-light illuminating device is turned on. When the object 200 is determined to be the user B, a yellow-light illuminating device corresponding to the user B is turned on. In addition, in order to facilitate identification of each user, a brightness-color table may be established by assigning a specific brightness value or illuminating color to each user in advance. When the processor 114 determines that the object 200 is the user A, a brightness value and an illuminating color corresponding to the user A are found from the brightness-color table so as to control the illuminating device based on the corresponding brightness value and illuminating color. As a result, the users currently at the moving positions can be identified when seeing the brightness values and illuminating colors illuminated from the illuminating devices.

In another embodiment, the above first brightness, second brightness, third brightness, and fourth brightness may respectively correspond to different time periods. For example, the illuminating demands for each time period are different. For example, when the sun has just gone down, the sky is not completely dark. At this time, only a lower brightness needs to be turned on to meet the illuminating demands. When the night grows late, the sky is completely dark. Then, a higher brightness needs to be turned on to meet the illuminating demands. Therefore, the illuminating control system 100 according to the present disclosure can further provide different brightness depending on different time periods. As a result, not only can the power be further saved, but the illuminating control system 100 according to the present disclosure can also adaptively adjust the brightness based on the atmospheric condition, which in turn enhances each user's experience of the illuminating control system 100 according to the present disclosure.

In yet another embodiment, the processor 114 is further configured to determine whether the first moving position 420 or the second moving position 430 is within a predetermined range. Magnitudes of the first brightness and the second brightness correspond to the above determination result. For example, the first moving position 420 may be a very important area. For an important area, a maximum brightness of the illuminating device needs to be directly turned on to allow the user to clearly see the environmental condition of that area. Hence, the illuminating control system 100 further determines whether the first moving position 420 or the second moving position 430 is within the predetermined range (such as the important area) by using the processor 114, and controls the magnitudes of the first brightness and the second brightness illuminated by the first illuminating device 122 based on the determination result.

In still another embodiment, the processor 114 is further configured to determine a time period for which the object 200 stays at the first moving position 420 or the second moving position 430. When the time period reaches a predetermined value, the magnitudes of the first brightness and the second brightness illuminated by the first illuminating device 122 are correspondingly adjusted. For example, the illuminating control system 100 further determines the time period for which the object 200 stays at the first moving position 420 or the second moving position 430 by using the processor 114. It is assumed that the time period for which the object 200 stays at the first moving position 420 or the second moving position 430 is less than one second, which indicates that the object 200 only passes through the first moving position 420 or the second moving position 430. Under the circumstances, the processor 114 can be used to correspondingly adjust the magnitudes of the first brightness and the second brightness illuminated by the first illuminating device 122, for example, only illuminate the 30% brightness. In addition, it is assumed that the time period for which the object 200 stays at the first moving position 420 or the second moving position 430 is three seconds, which indicates that the object 200 actually stays at the above position. Under the circumstances, the processor 114 can be used to correspondingly adjust the magnitudes of the first brightness and the second brightness illuminated by the first illuminating device 122, for example, illuminate the 100% brightness.

Figure 6:
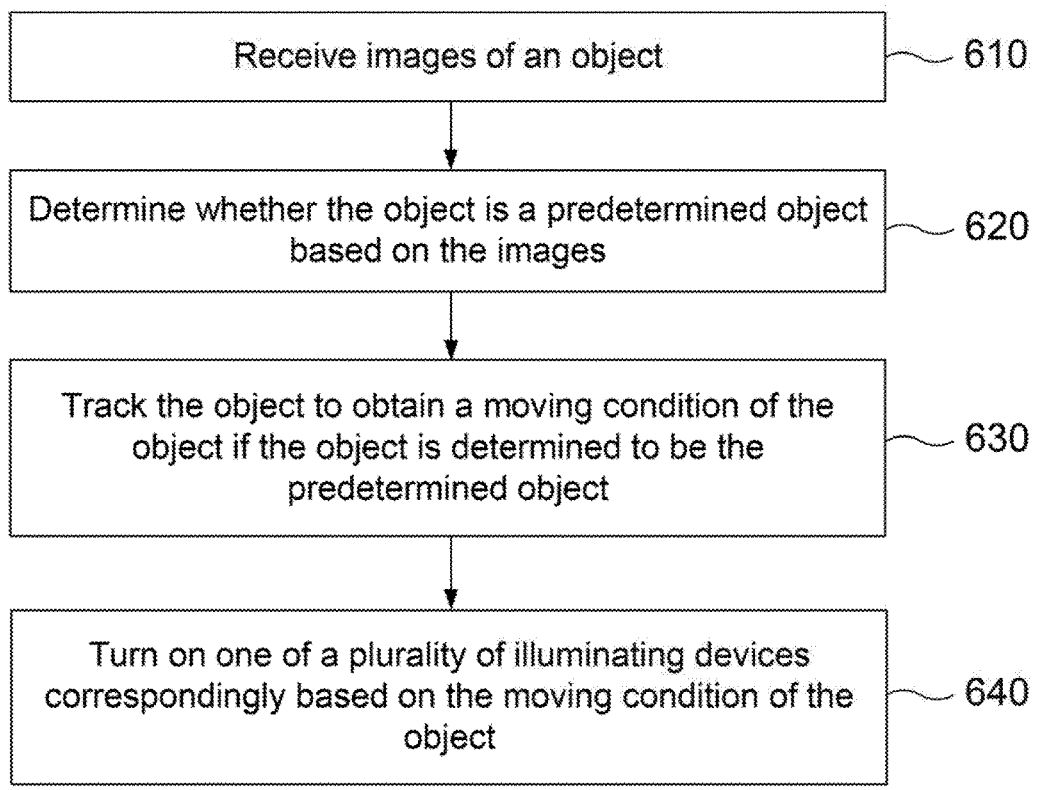
FIG. 6 depicts a flowchart of a method for controlling an illuminating device according to yet another embodiment of this disclosure.

FIG. 6 depicts a flowchart of a method 600 for controlling an illuminating device according to yet another embodiment of this disclosure. As shown in the figure, the method 600 for controlling the illuminating device comprises the following steps:

Step 610: receive images of an object;

Step 620: determine whether the object is a predetermined object based on the images;

Step 630: track the object to obtain a moving condition of the object if the object is determined to be the predetermined object; and Step 640: turn on one of a plurality of illuminating devices correspondingly based on the moving condition of the object.

In order to facilitate the understanding of the method 600 for controlling the illuminating device according to the embodiment of the present disclosure, a description is provided with referenced to FIG. 1 and FIG. 6. In step 610, the image capturing device 112 can be used to capture the images of the object 200. Subsequently, the processor 114 receives the images of the object 200 to perform subsequent processing. In step 620, the processor 114 can be used to determine whether the object 200 is the predetermined object based on the images of the object 200. In step 630, if the processor 114 determines that the object 200 is the predetermined object, the processor 114 controls the image capturing device 112 to track the object 200 so as to obtain the moving condition 300 of the object 200. In step 640, the processor 114 can be used to correspondingly turn on one of the plurality of illuminating devices based on the moving condition 300 of the object 200.

In one embodiment, the above step 640 comprises: predicting a first moving position of the object based on the moving condition to turn on a first illuminating device of the plurality of illuminating devices corresponding to the first moving position. For example, the processor 114 can be used to predict the first moving position 420 of the object 200 based on the moving condition 300 of the object 200 so as to turn on the first illuminating device 122 of the illuminating devices corresponding to the first moving position 420. In another embodiment, the processor 114 can be used to turn on the first illuminating device 122 of the plurality of illuminating devices closet to the first moving position 420 correspondingly based on the first moving position 420 of the object 200 thus predicted. In still another embodiment, the processor 114 can be used to turn on the first illuminating device 122 of the plurality of illuminating devices that illuminates light to the first moving position 420 correspondingly based on the first moving position 420 of the object 200 thus predicted. Since the illuminating devices do not necessarily illuminate light vertically downward as shown in FIG. 1, the illuminating devices may be disposed with a projection angle depending on practical needs. Hence, the processor 114 can turn on the illuminating device of the plurality of illuminating devices that illuminates light to the first moving position 420 correspondingly based on the first moving position 420 of the object 200 thus predicted.

In another embodiment, the processor 114 can be used to control the first illuminating device 122 to illuminate a first brightness (such as 30% brightness) when the first moving position 420 of the object 200 is predicted. A description is provided with reference to FIG. 2 and FIG. 6. When the object 200 reaches the first moving position 420, the processor 114 can be used to control the first illuminating device 122 to illuminate a second brightness (such as a 100% brightness).

A description is provided with reference to FIG. 3 and FIG. 6. In another embodiment, the processor 114 can be used to predict the second moving position 430 of the object 200 based on the moving condition 300. When the object 200 leaves the first moving position 420, the processor 114 can be used to control the first illuminating device 122 to illuminate a third brightness (such as a 20% or 30% brightness). When the object 200 actually reaches the second moving position 430, the processor 114 can be used to control the first illuminating device 122 to illuminate a fourth brightness (such as a 5% or 10% brightness) or turn off the first illuminating device 122.

In yet another embodiment, the moving condition 300 comprises one of a motion vector and a motion locus. For example, the image capturing device 112 can track the object 200 to obtain motion information of the object 200, such as a motion vector or a motion locus, etc., to allow the processor 114 to perform a judging process. Additionally, the processor 114 can be used to perform an image recognition action of the images of the object 200, such as feature recognition or face detection, etc., to determine whether the object 200 is the predetermined object.

In yet another embodiment, a number of the predetermined objects may be plural (such as a user A, a user B, a user C, etc.). The above first brightness, second brightness, third brightness, and fourth brightness may respectively correspond to one of the predetermined objects (such as the user A). For example, a brightness table may be established in advance according to requirements or preferences of each user. When the processor 114 determines that the object 200 is the user A, a brightness value corresponding to the user A is found from the brightness table to control the illuminating device based on the corresponding brightness value. As a result, each person has his own brightness value correspondingly so as to satisfy different usage demands of each user for the method for controlling the illuminating device 600 according to the present disclosure. In addition, in another embodiment, not only can the illuminating control system according to the present disclosure set a corresponding illuminating brightness according to the requirements or preferences of each user in advance as described above, but the illuminating control system according to the present disclosure can also set illuminating devices corresponding to different illuminating colors. For example, when the object 200 is determined to be the user A, a white-light illuminating device is turned on. When the object 200 is determined to be the user B, a yellow-light illuminating device corresponding to the user B is turned on. Other relevant embodiments are described as above, and a description in this regard is not provided.

In another embodiment, the above first brightness, second brightness, third brightness, and fourth brightness may respectively correspond to different time periods. For example, the illuminating demands for each time period are different. For example, when the sun has just gone down, the sky is not completely dark. At this time, only a lower brightness needs to be turned on to meet the illuminating demands. When the night grows late, the sky is completely dark. Then, a higher brightness needs to be turned on to meet the illuminating demands. Therefore, the method 600 for controlling the illuminating device according to the present disclosure can further provide different brightness depending on different time periods. As a result, not only can the power be further saved, but the method 600 for controlling the illuminating device according to the present disclosure can also adaptively adjust the brightness based on the atmospheric condition, which in turn enhances each user's experience of the method 600 for controlling the illuminating device according to the present disclosure.

In yet another embodiment, the method 600 for controlling the illuminating device further comprises determining whether the first moving position 420 or the second moving position 430 is within a predetermined range. Magnitudes of the first brightness and the second brightness correspond to the above determination result. For example, the first moving position 420 may be a very important area. For an important area, a maximum brightness of the illuminating system needs to be directly turned on to allow the user to clearly see the environmental condition of that area. Hence, the method 600 for controlling the illuminating device further determines whether the first moving position 420 or the second moving position 430 is within the predetermined range (such as the important area) by using the processor 114, and controls the magnitudes of the first brightness and the second brightness illuminated by the first illuminating device 122 based on the determination result.

In still another embodiment, the method 600 for controlling the illuminating device further comprises determining a time period for which the object 200 stays at the first moving position 420 or the second moving position 430. When the time period reaches a predetermined value, the magnitudes of the first brightness and the second brightness illuminated by the first illuminating device 122 are correspondingly adjusted. For example, the method 600 for controlling the illuminating device further determines the time period for which the object 200 stays at the first moving position 420 or the second moving position 430 by using the processor 114. It is assumed that the time period for which the object 200 stays at the first moving position 420 or the second moving position 430 is less than one second, which indicates that the object 200 only passes through the first moving position 420 or the second moving position 430. Under the circumstances, the processor 114 can be used to correspondingly adjust the magnitudes of the first brightness and the second brightness illuminated by the first illuminating device 122, for example, only illuminate the 30% brightness. In addition, it is assumed that the time period for which the object 200 stays at the first moving position 420 or the second moving position 430 is three seconds, which indicates that the object 200 actually stays at the above position. Under the circumstances, the processor 114 can be used to correspondingly adjust the magnitudes of the first brightness and the second brightness illuminated by the first illuminating device 122, for example, illuminate the 100% brightness.

It is thus understood from the embodiments of the present disclosure, the application of the present disclosure has the following advantages. The embodiments of the present disclosure provide an illuminating control system and a method for controlling an illuminating device to improve the problem that the prior art passive infrared sensor can only detect moving objects but can not determine the types of the moving objects, and also improve the problem that the prior art passive infrared sensor can not determine the moving direction of the objects and can not turn on the lighting fixtures in advance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for controlling an illuminating device comprising:
    receiving an image of an object;
    determining whether the object is a predetermined object based on the image;
    tracking the object to obtain a moving condition of the object if the object is determined to be the predetermined object; and
    turning on one of a plurality of illuminating devices correspondingly based on the moving condition of the object;
    wherein the step of turning on the one of the plurality of illuminating devices correspondingly based on the moving condition of the object comprises:
    predicting a first moving position of the object based on the moving condition to turn on a first illuminating device of the illuminating devices corresponding to the first moving position;
    wherein the step of predicting the first moving position of the object based on the moving condition to turn on the first illuminating device of the illuminating devices corresponding to the first moving position comprises:
    controlling the first illuminating device to illuminate a first brightness when the first moving position of the object is predicted;
    controlling the first illuminating device to illuminate a second brightness when the object reaches the first moving position, wherein the second brightness is greater than the first brightness; and
    determining a time period for which the object stays at the first moving position or a second moving position, magnitudes of the first brightness and the second brightness being correspondingly adjusted when the time period reaches a predetermined value.

2. The method for controlling the illuminating device of claim 1, wherein the step of predicting the first moving position of the object based on the moving condition to turn on the first illuminating device of the illuminating devices corresponding to the first moving position comprises:
    turning on the first illuminating device of the illuminating devices closest to the first moving position correspondingly based on the first moving position of the object which is predicted.

3. The method for controlling the illuminating device of claim 1, wherein the step of predicting the first moving position of the object based on the moving condition to turn on the first illuminating device of the illuminating devices corresponding to the first moving position comprises:
    turning on the first illuminating device of the illuminating devices that illuminates light to the first moving position correspondingly based on the first moving position of the object which is predicted.

4. The method for controlling the illuminating device of claim 1, further comprising:
    predicting the second moving position of the object based on the moving condition;
    controlling the first illuminating device to illuminate the first brightness when the object leaves the first moving position; and
    controlling the first illuminating device to illuminate the second brightness or turn off the first illuminating device when the object reaches the second moving position, wherein the second brightness is smaller than the first brightness.

5. The method for controlling the illuminating device of claim 1, wherein the moving condition comprises one of a motion vector and a motion locus.

6. The method for controlling the illuminating device of claim 1, wherein the moving condition comprises one of a motion vector and a motion locus.

7. The method for controlling the illuminating device of claim 2, wherein the moving condition comprises one of a motion vector and a motion locus.

8. The method for controlling the illuminating device of claim 1, wherein the step of determining whether the object is the predetermined object based on the image comprises:
    performing feature recognition or face detection of the image of the object to determine whether the object is the predetermined object.

9. The method for controlling the illuminating device of claim 1, wherein the step of determining whether the object is the predetermined object based on the image comprises:
performing feature recognition or face detection of the image of the object to determine whether the object is the predetermined object.

10. The method for controlling the illuminating device of claim 1, wherein a number of predetermined objects is plural, wherein the first brightness and the second brightness respectively correspond to one of the predetermined objects.

11. The method for controlling the illuminating device of claim 4, wherein a number of predetermined objects is plural, wherein the first brightness and the second brightness respectively correspond to one of the predetermined objects.

12. The method for controlling the illuminating device of claim 1, wherein the first brightness and the second brightness correspond to different time periods.

13. The method for controlling the illuminating device of claim 4, wherein the first brightness and the second brightness correspond to different time periods.

14. The method for controlling the illuminating device of claim 1, further comprising determining whether the first moving position is within a predetermined range, magnitudes of the first brightness and the second brightness corresponding to a determination result.

15. The method for controlling the illuminating device of claim 4, further comprising determining whether the first moving position or the second moving position is within a predetermined range, magnitudes of the first brightness and the second brightness corresponding to a determination result.

16. An illuminating control system for controlling a plurality of illuminating devices comprising:
an image capturing device configured to capture an image of an object; and
a processor coupled to the image capturing device configured to perform the method for controlling the illuminating device of claim 1.

17. A method for controlling an illuminating device comprising:
receiving an image of an object;
determining whether the object is a predetermined object based on the image;
tracking the object to obtain a moving condition of the object if the object is determined to be the predetermined object; and
turning on one of a plurality of illuminating devices correspondingly based on the moving condition of the object;
wherein the step of turning on the one of the plurality of illuminating devices correspondingly based on the moving condition of the object comprises:
controlling a first illuminating device to illuminate a first brightness when a first moving position of the object is predicted; and
controlling the first illuminating device to illuminate a second brightness when the object reaches the first moving position, wherein the second brightness is greater than the first brightness; and
determining whether the first moving position is within a predetermined range, magnitudes of the first brightness and the second brightness corresponding to a determination result.

18. A method for controlling an illuminating device comprising:
receiving an image of an object;
determining whether the object is a predetermined object based on the image;
tracking the object to obtain a moving condition of the object if the object is determined to be the predetermined object;
turning on one of a plurality of illuminating devices correspondingly based on the moving condition of the object;
predicting a first moving position of the object based on the moving condition to turn on a first illuminating device of the illuminating devices corresponding to the first moving position;
predicting a second moving position of the object based on the moving condition;
controlling the first illuminating device to illuminate a first brightness when the object leaves the first moving position;
controlling the first illuminating device to illuminate a second brightness or turn off the first illuminating device when the object reaches the second moving position, wherein the second brightness is smaller than the first brightness; and
determining a time period for which the object stays at the first moving position or the second moving position, magnitudes of the first brightness and the second brightness being correspondingly adjusted when the time period reaches a predetermined value.

* * * * *